(12) United States Patent
An et al.

(10) Patent No.: US 12,424,661 B2
(45) Date of Patent: Sep. 23, 2025

(54) LITHIUM SECONDARY BATTERY

(71) Applicant: LG Energy Solution, Ltd., Seoul (KR)

(72) Inventors: Yu Ha An, Daejeon (KR); Jeong Woo Oh, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 541 days.

(21) Appl. No.: 18/071,992

(22) Filed: Nov. 30, 2022

(65) Prior Publication Data

US 2023/0198019 A1 Jun. 22, 2023

(30) Foreign Application Priority Data

Dec. 20, 2021 (KR) .................. 10-2021-0182299

(51) Int. Cl.
| | |
|---|---|
| *H01M 10/0567* | (2010.01) |
| *H01M 4/02* | (2006.01) |
| *H01M 4/58* | (2010.01) |
| *H01M 4/583* | (2010.01) |
| *H01M 10/0568* | (2010.01) |
| *H01M 10/0569* | (2010.01) |
| *H01M 50/46* | (2021.01) |

(52) U.S. Cl.
CPC ..... *H01M 10/0567* (2013.01); *H01M 4/5825* (2013.01); *H01M 4/583* (2013.01); *H01M 10/0568* (2013.01); *H01M 10/0569* (2013.01); *H01M 50/46* (2021.01); *H01M 2004/027* (2013.01); *H01M 2004/028* (2013.01); *H01M 2300/0037* (2013.01); *H01M 2300/0051* (2013.01)

(58) Field of Classification Search
CPC ....... H01M 50/0567–0569; H01M 2300/0025; H01M 2300/0037
See application file for complete search history.

(56) References Cited

U.S. PATENT DOCUMENTS

| | | | | |
|---|---|---|---|---|
| 2003/0091905 A1* | 5/2003 | Nobuta | ........... | H01M 6/045 |
| | | | | 429/204 |
| 2005/0135045 A1* | 6/2005 | Nobuta | ........... | H01G 9/028 |
| | | | | 361/505 |
| 2012/0171576 A1* | 7/2012 | Tsai | ........... | H01M 10/0567 |
| | | | | 429/207 |
| 2012/0171579 A1* | 7/2012 | Tsai | ........... | H01M 4/5815 |
| | | | | 429/207 |
| 2013/0230770 A1* | 9/2013 | Oya | ........... | H01M 50/434 |
| | | | | 429/188 |
| 2020/0044287 A1* | 2/2020 | Kim | ........... | H01M 10/052 |
| 2022/0140391 A1* | 5/2022 | Kim | ........... | C07D 233/90 |
| | | | | 429/188 |
| 2022/0223911 A1* | 7/2022 | Kim | ........... | C07D 233/60 |

FOREIGN PATENT DOCUMENTS

| | | |
|---|---|---|
| CN | 112778205 A | 5/2021 |
| JP | H09139233 A | 5/1997 |
| JP | 3011529 B2 | 2/2000 |
| JP | 2003123834 A | 4/2003 |
| JP | 2012142260 A | 7/2012 |
| KR | 20130143083 A | 12/2013 |
| KR | 20180006054 A | 1/2018 |
| KR | 20190008100 A | 1/2019 |
| KR | 20200105227 A | 9/2020 |
| KR | 20210023756 A | 3/2021 |
| KR | 20210138937 A | 11/2021 |

* cited by examiner

*Primary Examiner* — Scott J. Chmielecki
(74) *Attorney, Agent, or Firm* — Lerner David LLP

(57) ABSTRACT

The present disclosure relates to a lithium secondary battery including: a non-aqueous electrolyte including a lithium salt, an organic solvent, a first additive represented by Chemical Formula 1 and a second additive represented by Chemical Formula 2; a positive electrode including a positive electrode active material including a lithium iron phosphate-based composite oxide; a negative electrode including an negative electrode active material; and a separator interposed between the positive electrode and the negative electrode.

15 Claims, No Drawings

LITHIUM SECONDARY BATTERY

CROSS-REFERENCE TO RELATED APPLICATION

This application claims priority from Korean Patent Application No. 10-2021-0182299, filed on Dec. 20, 2021, the disclosures of which are incorporated by reference herein.

BACKGROUND OF THE INVENTION

The present disclosure relates to a lithium secondary battery including an electrolyte including a specific additive combination and a lithium iron phosphate-based positive electrode material.

In lithium secondary batteries, an electrode assembly is generally formed by interposing a separator between a positive electrode including a positive electrode active material made of a transition metal oxide including lithium, and a negative electrode including a negative electrode active material capable of storing lithium ions, and the lithium secondary battery is manufactured by inserting the electrode assembly into a battery case, injecting an electrolyte as a medium for transferring lithium ions, and then sealing the electrode assembly.

Lithium secondary batteries can be miniaturized and have high energy density and operating voltage, so they are being applied to various fields such as mobile devices, electronic products, and electric vehicles. As the field of application of the lithium secondary battery is diversified, the required physical property conditions are also gradually increasing, and in particular, there is a demand for the development of a lithium secondary battery that can be stably driven even under high temperature conditions.

At high temperatures, the $PF_6^-$ anion may be thermally decomposed from a lithium salt such as $LiPF_6$ contained in the electrolyte to generate a Lewis acid such as $PF_5$, which reacts with moisture to generate HF. Transition metals of the positive electrode may be eluted into the electrolyte due to decomposition products such as PF5 and HF, and unstable structural changes of the positive electrode due to charging and discharging. In particular, when a lithium iron phosphate (LFP) positive electrode is included, the structural stability of the positive electrode can be improved, but electrolyte decomposition and battery performance degradation due to iron elution deepens, so improvement is required.

RELATED ART DOCUMENT

Patent Document

KR 10-2018-0006054 A

BRIEF SUMMARY OF THE INVENTION

The present disclosure is to solve the above problems, and to improve the high-temperature performance of a lithium secondary battery including an LFP-based positive electrode active material by introducing a non-aqueous electrolyte including a combination of two specific additives.

According to one embodiment, the present disclosure provides a lithium secondary battery including:

a non-aqueous electrolyte including a lithium salt, an organic solvent, a first additive represented by the following Chemical Formula 1 and a second additive represented by the following Chemical Formula 2;

a positive electrode including a positive electrode active material including a lithium iron phosphate-based composite oxide;

a negative electrode including a negative electrode active material; and a separator interposed between the positive electrode and the negative electrode; and

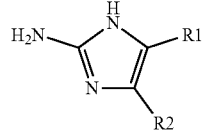

[Chemical Formula 1]

wherein,

R1 and R2 are each independently hydrogen; or an alkyl group having 1 to 5 carbon atoms,

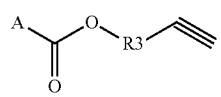

[Chemical Formula 2]

wherein,

A is a heterocyclic group having 3 to 5 carbon atoms or a heteroaryl group having 3 to 5 carbon atoms, and R3 is an alkylene group having 1 to 3 carbon atoms.

The lithium secondary battery according to the present disclosure can improve the high-temperature lifespan and resistance characteristics of the lithium secondary battery including the lithium iron phosphate-based positive electrode active material by including the non-aqueous electrolyte including a specific additive combination.

DETAILED DESCRIPTION OF THE INVENTION

Hereinafter, the present disclosure will be described in more detail.

In general, anions included in lithium salts such as $LiPF_6$, which are widely used in electrolytes for lithium secondary batteries, form decomposition products such as hydrogen fluoride (HF) and $PF_5$ due to thermal decomposition or moisture, and this phenomenon is intensified when driven under high temperature conditions. Since the decomposition product has acid properties, it degrades the electrode surface properties in the battery.

Due to the decomposition product generated in this way and the structural change of the negative electrode due to repeated charging and discharging, the transition metals in the positive electrode are easily eluted into the electrolyte, and the eluted transition metal is redeposited again on the positive electrode to increase the resistance of the positive electrode. In addition, when the eluted transition metal moves to the negative electrode through the electrolyte, electrodeposition on the negative electrode causes destruction of the solid electrolyte interface (SEI) film and an additional electrolytic decomposition reaction, which causes problems such as consumption of lithium ions and increased resistance.

In particular, in the case of a battery including a lithium iron phosphate (LFP)-based positive electrode material having a low discharge potential and high moisture absorption, decomposition products caused by moisture in the electrode and electrolyte during initial charging/discharging can greatly affect battery performance. In addition, in the LFP-based positive electrode material, since capacity is expressed by phase boundary transfer due to diffusion of lithium ions during charging and discharging, when the lithium transfer channel is disturbed due to the elution of iron, an irreversible capacity loss may occur to that extent.

In order to solve this problem, the present inventors have found that by including the first additive represented by the following Chemical Formula 1 and the second additive represented by the following Chemical Formula 2 in the non-aqueous electrolyte, there is effect of inhibiting the elution of iron ions and strengthening the formation of the SEI film to improve the performance of the battery.

Hereinafter, each configuration constituting the present disclosure will be described in more detail.

Non-aqueous electrolyte

The lithium secondary battery according to the present disclosure includes a non-aqueous electrolyte including a lithium salt, an organic solvent, a first additive represented by the following Chemical Formula 1 and a second additive represented by the following Chemical Formula 2.

Hereinafter, each component of the non-aqueous electrolyte will be specifically described.

(1) First Additive and Second Additive

The non-aqueous electrolyte of the present disclosure includes a first additive represented by the following Chemical Formula 1.

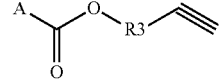

[Chemical Formula 1]

wherein,

R1 and R2 are each independently hydrogen; or an alkyl group having 1 to 5 carbon atoms.

In one embodiment of the present disclosure, R1 and R2 are each hydrogen, and specifically, the compound represented by Chemical Formula 1 may be represented by Chemical Formula 1A below.

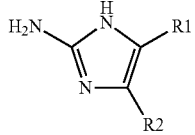

[Chemical Formula 1A]

Since the first additive contains a primary amine and a secondary amine in its structure, the Lewis acidity of the electrolytic solution can be more effectively neutralized, the electrolytic decomposition reaction and the elution of the transition metal can be reduced through the introduction of the first additive. In addition, since a nitrogen atom-based solid electrolyte interface (SEI) film and a cathode electrolyte interface (CEI) film are formed on the electrode due to the amino group of the first additive, it may contribute to thermal stability.

In one embodiment of the present disclosure, the content of the first additive may be in a range of 0.05 wt % to 2 wt %, preferably 0.1 wt % to 1 wt %, more preferably 0.2 wt % to 0.5 wt %, based on the total weight of the non-aqueous electrolyte. When the first additive is excessively added, considering the excessively participation in the decomposition reaction at the interface between the electrode and the electrolyte solution and the excessively large film resistance, which may cause a problem of increasing the resistance of the battery, the content of the first additive is preferably 2% by weight or less.

In addition, the non-aqueous electrolyte of the present disclosure includes a second additive represented by the following Chemical Formula 2.

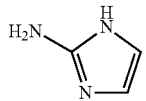

[Chemical Formula 2]

wherein,

A is a heterocyclic group having 3 to 5 carbon atoms or a heteroaryl group having 3 to 5 carbon atoms, and R3 is an alkylene group having 1 to 3 carbon atoms.

Since the second additive represented by Chemical Formula 2 includes a propargyl functional group, the functional group is reduced and decomposed to form an SEI film having high passivation ability on the surface of the negative electrode, thereby improving the high temperature durability of the negative electrode itself and preventing the electrode-position of transition metals on the surface the negative electrode. In addition, it is possible to prevent the destruction of the cathode electrolyte interface (CEI) film formed on the surface of the positive electrode due to the first additive by binding with $PF_5$, which is a decomposition product of the electrolyte, and suppress the generation of HF, and suppress additional electrolyte decomposition.

In one embodiment of the present disclosure, A in Chemical Formula 2 may be a nitrogen-containing heterocyclic group having 3 to 5 carbon atoms or a nitrogen-containing heteroaryl group having 3 to 5 carbon atoms, preferably a nitrogen-containing heteroaryl group having 3 to 5 carbon atoms, more preferably imidazole.

In one embodiment of the present disclosure, the second additive may be represented by the following Chemical Formula 2-1.

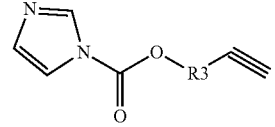

[Chemical Formula 2-1]

wherein,

R3 is as defined in Chemical Formula 2 above.

In one embodiment of the present disclosure, R3 in Formula 2 may be a straight-chain or branched alkylene group having 1 to 3 carbon atoms, preferably a straight-chain alkylene group having 1 to 3 carbon atoms, more preferably a methylene group.

In one embodiment of the present disclosure, the second additive may be represented by the following Chemical Formula 2A.

[Chemical Formula 2A]

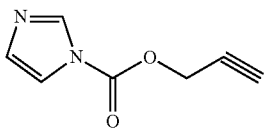

In one embodiment of the present disclosure, the content of the second additive may be in a range of 0.05 wt % to 2 wt %, preferably 0.1 wt % to 1 wt %, more preferably 0.3 wt % to 0.5 wt %, based on the total weight of the non-aqueous electrolyte. When the content of the second additive is excessive, considering the excessively participation in the decomposition reaction at the interface between the electrode and the electrolyte solution and the excessively large film resistance, which may cause a problem of increasing the resistance of the battery, the content of the second additive is preferably 2% by weight or less.

In the non-aqueous electrolyte according to the present disclosure, when the first additive and the second additive are used together, it is more advantageous for forming a negative electrode film having a lower resistance than when the first additive is used alone. That is, there is an effect of improving high temperature performance by improving the initial resistance and strengthening the negative electrode film. In addition, since the first additive has a higher binding energy with $PF_5$ than the second additive, which is more effective in inhibiting HF generation, the effect of inhibiting the elution of iron ions from the LFP negative electrode due to the combination of the two additives can be further increased.

In one embodiment of the present disclosure, the weight ratio of the first additive and the second additive in the non-aqueous electrolyte may be in range of 1:0.5 to 1:2.5, preferably 1:1 to 1:2.5. Being included in the above weight ratio range is preferable in that it is possible to maximize the effect of improving the high-temperature performance of the battery while minimizing an increase in initial resistance.

(2) Third Additive

In one embodiment of the present disclosure, the non-aqueous electrolyte may include, as a third additive, one or more compounds selected from a cyclic carbonate-based compound, a halogen-substituted carbonate-based compound, a sultone-based compound, a sulfate-based compound, a phosphate-based or phosphite-based compound, a nitrile-based compound, an amine-based compound, a silane-based compound, a benzene-based compound, or lithium salt-based compounds.

The carbonate-based compound may be one or more of vinylene carbonate (VC), vinylethylene carbonate (VEC), or fluoroethylene carbonate (FEC), and preferably vinylene carbonate (VC).

The sultone-based compound is a material capable of forming a stable SEI film by a reduction reaction on the surface of the negative electrode, and may be one or more selected from the group consisting of 1,3-propane sultone (PS), 1,4-butane sultone, ethenesultone, 1,3-propene sultone (PRS), 1,4-butene sultone, and 1-methyl-1,3-propene sultone, preferably 1,3-propane sultone (PS).

The sulfate-based compound is a material which is electrically decomposed on the surface of the negative electrode to form a stable SEI film that does not crack even when stored at a high temperature, and may be one or more selected from ethylene sulfate (Esa), trimethylene sulfate (TMS) or methyl trimethylene methyl triethylene sulfate (MTMS), preferably ethylene sulfate (Esa).

The phosphate-based or phosphite-based compound may be one or more selected from lithium difluoro(bisoxalato) phosphate, lithium difluorophosphate, tris(trimethyl silyl) phosphate, tris(trimethyl silyl) phosphite, tris(2,2,2-trifluoroethyl) phosphate or tris(trifluoroethyl) phosphite.

The nitrile-based compound may be one or more selected from succinonitrile (SN), adiponitrile (ADN), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, ethylene glycol bis (2-cyanoethyl) ether (ASA3), 1,3,6-hexane tricarbonitrile (HTCN), 1,4-dicyano 2-butene (DCB) or 1,2,3-tris(2-cyanoethyl)propane (TCEP).

The amine-based compound may be one or more selected from triethanolamine or ethylenediamine, and the silane-based compound may be tetravinylsilane.

The benzene-based compound may be one or more selected from monofluorobenzene, difluorobenzene, trifluorobenzene, or tetrafluorobenzene.

The lithium salt-based compound is a compound different from the lithium salt contained in the non-aqueous electrolyte, and may be one or more compounds selected form lithium difluorophosphate (LiDFP; $LiPO_2F_2$), lithium bisoxalatoborate (LiBOB; $LiB(C_2O_4)_2$), lithium tetrafluoroborate ($LiBF_4$), lithium tetraphenylborate, or lithium difluoro (bisoxalato) phosphate (LiDFOP).

Preferably, the non-aqueous electrolyte of the present disclosure may further include one or more third additives selected from the group consisting of vinylene carbonate (VC), 1,3-propane sultone (PS), and ethylene sulfate (Esa). In this case, since a stable film is formed on the positive electrode, there is an advantage in improving the high-temperature performance of the battery.

In one embodiment of the present disclosure, the content of the third additive may be in range of 0.05 wt % to 5 wt %, preferably 0.1 wt % to 3 wt %, based on the total weight of the non-aqueous electrolyte. The content of the third additive is preferably 5 wt % or less in terms of lowering the initial resistance.

(3) Organic Solvent

The non-aqueous electrolyte of the present disclosure includes an organic solvent.

As the organic solvent, various organic solvents commonly used in lithium electrolytes may be used without limitation. For example, the organic solvent may be a cyclic carbonate-based solvent, a linear carbonate-based solvent, a linear ester-based solvent, a cyclic ester-based solvent, a nitrile-based solvent, or a mixture thereof, preferably mixtures of a cyclic carbonate-based solvent and a linear carbonate-based solvent.

The cyclic carbonate-based solvent is a high-viscosity organic solvent and has a high dielectric constant, so that lithium salts in the electrolyte can be well dissociated, and may include one or more selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and preferably ethylene carbonate (EC).

In addition, the linear carbonate-based solvent is an organic solvent having a low viscosity and a low dielectric constant, and may be one or more selected from the group consisting of dimethyl carbonate (DMC), diethyl carbonate (DEC), dipropyl carbonate, ethyl methyl carbonate (EMC), methyl propyl carbonate and ethyl propyl carbonate, preferably may include dimethyl carbonate (DMC), or ethyl methyl carbonate (EMC). When DMC is used alone, ion conductivity is increased to have a resistance improvement effect at room temperature, but it is unstable at a high temperature, gas formation by a reduction reaction is large, a freezing point is high, and low-temperature performance is greatly lowered. Therefore, by using EMC together, gas generation can be suppressed and low temperature performance can be improved.

The organic solvent is preferably a mixture of a cyclic carbonate-based solvent and a linear carbonate-based solvent in order to prepare an electrolyte having high ionic conductivity.

The linear ester-based solvent may be one or more selected from methyl acetate, ethyl acetate, propyl acetate, methyl propionate, ethyl propionate, propyl propionate or butyl propionate, preferably methyl propionate, ethyl propionate or propyl propionate.

The cyclic ester-based solvent may be one or more selected from γ-butyrolactone, γ-valerolactone, γ-caprolactone, α-valerolactone or ε-caprolactone.

The nitrile-based solvent may be one or more selected from succinonitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile or 4-fluorophenylacetonitrile, preferably succinonitrile.

In the total weight of the non-aqueous electrolyte, excluding all components other than the organic solvent, for example, first to third additives, and the lithium salt, the remainder may be an organic solvent unless otherwise specified.

(4) Lithium Salt

The non-aqueous electrolyte of the present disclosure includes a lithium salt.

As the lithium salt, those commonly used in electrolytes for lithium secondary batteries may be used without limitation, specifically, the lithium salt may include $Li^+$ as a cation, and one or more selected from $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $BF_2C_2O_4CHF-$, $PF_4C_2O_4^-$, $PF_2C_4O_8^-$, $PO_2F_2^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$ or $SCN^-$ as anions.

Specifically, the lithium salt may be one or more selected from $LiPF_6$, $LiClO_4$, $LiBF_4$, $LiN(FSO_2)_2$(LiFSI), LiTFSI, lithium bis(pentafluoroethanesulfonyl)imide (LiBETI), $LiSO_3CF_3$, $LiPO_2F_2$, lithium bis(oxalate)borate (LiBOB), lithium difluoro(oxalate) borate (LiFOB), lithium difluoro(bisoxalato) phosphate (LiDFOP), lithium tetrafluoro(oxalate) phosphate (LiTFOP), or lithium fluoromalonato (difluoro) borate (LiFMDFB), preferably $LiPF_6$.

In one embodiment of the present disclosure, the concentration of the lithium salt in the non-aqueous organic solution including the lithium salt and the organic solvent may be 0.5 M to 4.0 M, specifically 0.5 M to 3.0 M, more specifically 0.8 M to 2.0 M. When the concentration of the lithium salt is within the above range, it is possible to obtain an appropriate electrolyte impregnation property by preventing the viscosity and surface tension from becoming excessively high while sufficiently securing the effect of improving low-temperature output and improving cycle characteristics.

Positive Electrode

The positive electrode according to the present disclosure includes a lithium iron phosphate (LFP)-based composite oxide. Specifically, the positive electrode may include a positive electrode current collector and a positive electrode active material layer formed on the positive electrode current collector, and the positive electrode active material included in the positive electrode active material layer may include the lithium iron phosphate-based composite oxide.

The LFP-based positive electrode has an olivine structure and has superior structural stability and a long-term lifespan compared to a layered negative electrode having a risk of structural collapse, such as an NCM-based positive electrode. However, since the LFP-based positive electrode has high moisture sensitivity and voltage dependence and is vulnerable to the problem of metal ion elution, when these problems are solved through the combination of the additives of the present disclosure, a battery superior in stability and lifespan can be obtained compared to the NCM-based positive electrode can be obtained.

The positive electrode active material layer may be prepared by coating a positive electrode slurry including a positive electrode active material, a binder, a conductive material, and a solvent on the positive electrode current collector, followed by drying and rolling.

The positive electrode current collector is not particularly limited as long as it has conductivity without causing a chemical change in the battery, and for example, stainless steel; aluminum; nickel; titanium; calcinated carbon; or aluminum or stainless steel surface-treated with carbon, nickel, titanium, silver, etc. may be used.

The lithium iron phosphate-based composite oxide may be represented by Chemical Formula 3 below.

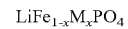   [Chemical Formula 3]

wherein,

M is one or more selected from Ni, Co, Mn, Al, Mg, Y, Zn, In, Ru, Sn, Sb, Ti, Te, Nb, Mo, Cr, Zr, W, Ir, or V;

0≤x<1.

In one embodiment of the present disclosure, the lithium iron phosphate-based composite oxide may be $LiFePO_4$.

The positive active material may be present in an amount of 80 wt % to 99 wt %, specifically, 90 wt % to 99 wt %, based on the total weight of solids in the positive electrode slurry. At this time, when the content of the positive active material is 80 wt % or less, energy density may be lowered, and thus capacity may be lowered.

The binder is a component that assists in bonding of the active material and the conductive material and bonding to the current collector, and may be added in an amount of 1 wt % to 30 wt %, based on the total weight of solids in the positive electrode slurry. Examples of such binders may include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer, a sulfonated ethylene-propylene-diene monomer, styrene-butadiene rubber, fluororubber, and various copolymers thereof.

In addition, the conductive material is a material that imparts conductivity without causing a chemical change to the battery, and may be added in an amount of 0.5 wt % to 20 wt % based on the total weight of solids in the positive electrode slurry.

The conductive material may include, for example, carbon black such as acetylene black, Ketjen black, channel black, furnace black, lamp black and thermal black; graphite powders such as natural graphite, artificial graphite, carbon nanotubes and graphite; conductive fibers such as carbon fibers and metal fibers; conductive powders such as carbon fluoride powder, aluminum powder, and nickel powder; conductive whiskers such as zinc oxide and potassium titanate; conductive metal oxides such as titanium oxide; conductive materials such as polyphenylene derivatives; and combinations thereof.

In addition, the solvent of the positive electrode slurry may include an organic solvent such as N-methyl-2-pyrrolidone (NMP), and may be used in an amount having a desirable viscosity when the positive electrode active material, a binder, and a conductive material are included. For example, it may be included so that the solids concentration in the positive electrode slurry including the positive electrode active material, the binder, and the conductive material is in a range of 40 wt % to 90 wt %, preferably 50 wt % to 80 wt %.

Negative Electrode

The lithium secondary battery according to the present disclosure includes a negative electrode including a negative electrode active material, and the negative electrode may be manufactured by coating a negative electrode slurry including a negative electrode active material, a binder, a conductive material and a solvent on a negative electrode current collector, followed by drying and rolling.

The negative electrode current collector generally has a thickness of 3 μm to 500 μm. The negative electrode current collector is not particularly limited as long as it has conductivity without causing a chemical change in the battery, and for example, stainless steel; aluminum; nickel; titanium; calcinated carbon; or aluminum or stainless steel, copper or stainless steel surface-treated with carbon, nickel, titanium, silver, etc.; or an aluminum-cadmium alloy may be used. In addition, like the positive electrode current collector, fine irregularities may be formed on a surface of the negative electrode current collector to strengthen the adhesion with the negative electrode active material, and may take various forms such as films, sheets, foils, nets, porous materials, foams, non-woven materials, etc.

In addition, the negative active material may include one or more selected from a carbon-based material; metals or alloys of these metals and lithium; metal composite oxides; materials capable of doping and dedoping lithium; lithium metal; or transition metal oxides, preferably a carbon-based material.

As the carbon-based material, any material capable of reversibly intercalating/deintercalating lithium ions may be used without particular limitation, and representative examples thereof include crystalline carbon, amorphous carbon, and a combination thereof. Examples of the crystalline carbon include graphite such as amorphous, plate-like, flake, spherical or fibrous natural graphite and artificial graphite, and examples of the amorphous carbon include soft carbon (soft carbon: low-temperature calcined carbon), hard carbon, mesophase pitch carbide, and calcined coke, etc. Preferably, a mixture of natural graphite and artificial graphite may be used.

Examples of the above metals or alloys of these metals with lithium include metals selected from the group consisting of Cu, Ni, Na, K, Rb, Cs, Fr, Be, Mg, Ca, Sr, Si, Sb, Pb, In, Zn, Ba, Ra, Ge, Al, and Sn or an alloy of these metals and lithium.

Examples of the metal composite oxide include one or more selected from the group consisting of $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, $Li_xFe_2O_3 (0 \le x \le 1)$, $Li_xWO_2 (0 \le x \le 1)$ and $Sn_xMe_{1-x}Me'_yO_z$ (Me: Mn, Fe, Pb, Ge; Me': Al, B, P, Si, elements of groups 1, 2 and 3 of the periodic table, halogens; $0 < x \le 1$; $1 \le y \le 3$; $1 \le z \le 8$).

Examples of the material capable of doping and dedoping lithium include Si, $SiO_x$ (0<x<2), an Si—Y alloy (wherein Y is an element selected from the group consisting of alkali metals, alkaline earth metals, group 13 elements, group 14 elements, transition metals, rare earth elements and combinations thereof, but is not Si), Sn, $SnO_2$, Sn—Y (wherein Y is an element selected from the group consisting of alkali metals, alkaline earth metals, group 13 elements, group 14 elements, transition metals, rare earth elements, and combinations thereof and is not Sn), and one or more of these and $SiO_2$ may be mixed and used. The element Y may be selected from the group consisting of Mg, Ca, Sr, Ba, Ra, Sc, Y, Ti, Zr, Hf, Rf, V, Nb, Ta, Db(dubnium), Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

Examples of the transition metal oxide include a lithium-containing titanium composite oxide (LTO), vanadium oxide, lithium vanadium oxide, etc.

The negative active material may be present in an amount of 60% to 99% by weight based on the total weight of the solids in the negative electrode slurry.

The binder is a component that assists in bonding between the conductive material, the active material, and the current collector, and may typically be added in an amount of 1 wt % to 30 wt %, based on the total weight of the solids in the negative electrode slurry. Examples of such binders may include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer, a sulfonated ethylene-propylene-diene monomer, styrene-butadiene rubber, fluororubber, and various copolymers thereof.

The conductive material is a component for further improving the conductivity of the negative electrode active material, and may be added in an amount of 0.5 wt % to 20 wt % based on the total weight of the solids in the negative electrode slurry. The conductive material is not particularly limited as long as it has conductivity without causing a chemical change in the battery, for example, may include carbon black such as acetylene black, Ketjen black, channel black, furnace black, lamp black and thermal black; graphite powder, such as natural graphite, artificial graphite, carbon nanotubes, and graphite with a highly developed crystal structure; conductive fibers such as carbon fibers and metal fibers; conductive powders such as carbon fluoride powder, aluminum powder, and nickel powder; conductive whiskers such as zinc oxide and potassium titanate; conductive metal oxides such as titanium oxide; conductive materials such as a polyphenylene derivative and combinations thereof.

The solvent of the negative electrode slurry is water; alternatively, it may include an organic solvent such as NMP and alcohol, and may be used in an amount to achieve a desirable viscosity when the negative active material, binder, and conductive material are included. For example, it may be included so that the solids concentration in the slurry including the negative electrode active material, the binder, and the conductive material is in a range of 30 wt % to 80 wt %, preferably 40 wt % to 70 wt %.

Separator

The lithium secondary battery according to the present disclosure includes a separator between the positive electrode and the negative electrode.

The separator separates the negative electrode and the positive electrode and provides a passage for lithium ions to move, and may be used without any particular limitation as long as it is normally used as a separator in a lithium secondary battery, in particular, it is preferable to use an electrolyte that has low resistance to ion movement and an excellent electrolyte impregnating ability and stability.

Specifically, a porous polymer film as a separator, for example, a porous polymer film made of a polyolefin-based polymer such as an ethylene homopolymer, a propylene homopolymer, an ethylene/butene copolymer, an ethylene/hexene copolymer, and an ethylene/methacrylate copolymer; or a laminated structure including two or more layers of these materials may be used. In addition, a conventional porous nonwoven fabric, for example, a nonwoven fabric made of high melting point glass fiber, polyethylene terephthalate fiber, etc. may be used. In addition, a coated separator including a ceramic component or a polymer material may be used to secure heat resistance or mechanical strength, and may be used in a single-layer or multi-layer structure.

The lithium secondary battery according to the present disclosure as described above is usefully used in the field of a portable device such as a mobile phone, a notebook computer, a digital camera; and an electric vehicle field such as a hybrid electric vehicle (HEV).

Accordingly, according to another embodiment of the present disclosure, a battery module including the lithium secondary battery as a unit cell and a battery pack including the same are provided.

The battery module or battery pack may be used as a power source for a power tool; electric vehicles, including electric vehicles (EVs), hybrid electric vehicles, and plug-in hybrid electric vehicles (PHEVs); and one or more medium and large-sized devices of a system for power storage.

The external shape of the lithium secondary battery of the present disclosure is not particularly limited, but may be a cylindrical type using a can, a prismatic type, a pouch type, or a coin type.

The lithium secondary battery according to the present disclosure may be used in a battery cell used as a power source of a small device, or may also be preferably used as a unit cell of a medium or large battery module including a plurality of battery cells.

Hereinafter, the present disclosure will be described in more detail through specific examples.

EXAMPLES

Example 1

(Preparation of Non-Aqueous Electrolyte)

Ethylene carbonate (EC):dimethyl carbonate (DMC):ethyl methyl carbonate (EMC) was mixed in a volume ratio of 30:40:30, and then $LiPF_6$ was dissolved to 1.0M to prepare a non-aqueous organic solution. 0.2 wt % of the compound represented by Chemical Formula 1A, 0.3 wt % of the compound represented by Chemical Formula 2A, 2.5 wt % of vinylene carbonate (VC), 0.5 wt % of 1,3-propanesultone (PS), 0.7 wt % of ethylene sulfate (Esa) and the remainder as the non-aqueous organic solution were mixed to prepare 100 wt % of a non-aqueous electrolyte.

(Manufacturing of Lithium Secondary Battery)

$LiFePO_4$ as a positive electrode active material, carbon black as a conductive material, polyvinylidene fluoride as a binder, and nitrile-butadiene rubber were dissolved in N-methyl-2-pyrrolidone (NMP) as a solvent in a weight ratio of 95.86:0.8:2.2:1.14 was added to prepare a positive electrode slurry (solids contents: 67.5 wt %). The positive electrode slurry was applied on a positive electrode current collector (Al thin film) having a thickness of 15 μm, and dried and roll pressed to prepare a positive electrode.

Graphite (artificial graphite:natural graphite was blended in a weight ratio of 8:2) as a negative electrode active material, styrene-butadiene rubber-carboxymethylcellulose (SBR-CMC) as a binder, carbon black as a conductive material, and carboxymethyl cellulose sodium (CMC) as a thickener were mixed in distilled water as a solvent in a weight ratio of 96.0:2.3:0.7:1 to prepare a negative electrode active material slurry having a solids content of 47.0 wt %. The negative electrode active material slurry was applied on a negative electrode current collector (Cu thin film) having a thickness of 8 μm, dried and rolled to prepare a negative electrode.

An electrode assembly was prepared by sequentially stacking the positive electrode, a polyolefin-based porous separator coated with inorganic mineral particles ($Al_2O_3$), and the negative electrode.

A lithium secondary battery was manufactured by accommodating the assembled electrode assembly in a pouch-type battery case, and injecting the prepared non-aqueous electrolyte.

Example 2

A lithium secondary battery was manufactured in the same manner as in Example 1, except that the content of the compound represented by Chemical Formula 2A was changed to 0.5 wt % during the preparation of the non-aqueous electrolyte.

Example 3

A lithium secondary battery was manufactured in the same manner as in Example 1, except that the content of the compound represented by Chemical Formula 1A was changed to 0.5 wt % and the content of the compound represented by Chemical Formula 2A was changed to 0.5 wt % during the preparation of the non-aqueous electrolyte.

Comparative Example 1

A lithium secondary battery was manufactured in the same manner as in Example 1, except that the compound represented by Chemical Formula 2A was not added during the preparation of the non-aqueous electrolyte.

Comparative Example 2

A lithium secondary battery was manufactured in the same manner as in Example 1, except that the compound represented by Chemical Formula 1A was not added during the preparation of the non-aqueous electrolyte.

Comparative Example 3

A lithium secondary battery was manufactured in the same manner as in Example 1, except that the positive electrode active material slurry prepared as follows was used instead of the positive electrode active material slurry described in Example 1.

The positive electrode active material slurry (solids contents: 67.5 wt %) was prepared by mixing $Li[Ni_{0.8}Co_{0.1}Mn_{0.1}]O_2$ as a positive electrode active material, carbon black as a conductive material, and polyvinylidene fluoride (PVDF) as a binder in a weight ratio of 94:3:3 with N-methyl-2-pyrrolidone (NMP) as a solvent.

Comparative Example 4

A lithium secondary battery was manufactured in the same manner as in Example 1, except that the compound represented by the following Chemical Formula B1 (imidazole) was used instead of the compound represented by the Chemical Formula 1A during the preparation of the non-aqueous electrolyte.

[Chemical Formula B1]

Comparative Example 5

A non-aqueous electrolyte was prepared in the same manner as in Example 1, except that the compound represented by the following Chemical Formula B2 was used instead of the compound represented by the Chemical Formula 1A during the preparation of the non-aqueous electrolyte.

[Chemical Formula B2]

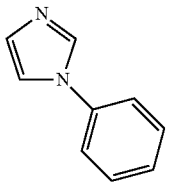

Experimental Examples

Experimental Example 1: Evaluation of High Temperature (60° C.) Storage Characteristics Each of the lithium secondary batteries prepared in Examples and Comparative Examples was fully charged up to SOC 100% at 4.2V (0.05 C cut off) at 25° C. under CC/CV and 0.33 C conditions. Thereafter, the fully charged lithium secondary battery was stored at a high temperature (60° C.) for 12 weeks, and then the capacity retention rate and resistance increase rate were measured, and the results are shown in Table 1 below.

At this time, the capacity retention rate was calculated by substituting the discharge capacity of the lithium secondary battery measured before high temperature storage and the discharge capacity of the lithium secondary battery measured after high temperature storage using a PNE-0506 charger and discharger (manufacturer: PNE Solution, 5V, 6A) into the following Equation 1.

The resistance increase rate was calculated by substituting the initial resistance value measured before high-temperature storage and the resistance value measured after high-temperature storage into the following Equation 2.

Capacity retention rate (%)=(discharge capacity after high temperature storage/discharge capacity before high temperature storage)×100    Equation 1:

Resistance increase rate (%)={(resistance value after high temperature storage−initial resistance value)/initial resistance value}×100    Equation 2:

Experimental Example 2

Evaluation of High Temperature (45° C.) Lifespan Characteristics

After activating the lithium secondary batteries manufactured in Examples and Comparative Examples at 0.1 C CC, respectively, degassing was performed.

Thereafter, at 25° C. under constant current-constant voltage (CC-CV) charging conditions, charging was performed at 0.33 C CC up to 3.6V, followed by 0.05 C current cut-off, and discharging was performed at 0.33 C up to 2.5V under CC conditions. Thereafter, at 45° C. under constant current-constant voltage (CC-CV) charging conditions, charging was performed at 0.33 C CC up to 3.6V, followed by 0.05 C current cut-off, and discharging was performed at 0.33 C up to 2.5V under CC conditions.

The discharge capacity and resistance after 1 cycle and after 400 cycles were measured using a charger and discharger (5V, 6A), respectively, while charging and discharging at a high temperature (45° C.), taking the above charging and discharging as one cycle.

By substituting the measured discharge capacity and resistance into Equations 3 and 4, respectively, capacity retention rates and resistance increase rates were calculated, and the results are shown in Table 1 below.

Capacity retention rate (%)=(discharge capacity after 400 cycles/discharge capacity after one cycle)×100    Equation 3:

Resistance increase rate (%)={(resistance after 400 cycles−resistance after 1 cycle)/resistance after 1 cycle}×100    Equation 4:

TABLE 1

|  | Positive electrode active material | First additive | | Second additive | | Experimental Example 1 | | Experimental Example 2 | |
|---|---|---|---|---|---|---|---|---|---|
|  |  | Chemical Formula | Content (wt %) | Chemical Formula | Content (wt %) | Capacity retention rate (%) | Resistance increase rate (%) | Capacity retention (%) | Resistance increase rate (%) |
| Example 1 | LFP | 1A | 0.2 | 2A | 0.3 | 78 | 9.9 | 89.1 | 17.8 |
| Example 2 | LFP | 1A | 0.2 | 2A | 0.5 | 79.4 | 9 | 89.1 | 15.1 |
| Example 3 | LFP | 1A | 0.5 | 2A | 0.5 | 79.6 | 8.5 | 88.9 | 14.6 |
| Comparative Example 1 | LFP | 1A | 0.2 | — | — | 73.9 | 42.2 | 87.8 | 40.3 |

TABLE 1-continued

| | Positive electrode active material | First additive Chemical Formula | First additive Content (wt %) | Second additive Chemical Formula | Second additive Content (wt %) | Experimental Example 1 Capacity retention rate (%) | Experimental Example 1 Resistance increase rate (%) | Experimental Example 2 Capacity retention (%) | Experimental Example 2 Resistance increase rate (%) |
|---|---|---|---|---|---|---|---|---|---|
| Comparative Example 2 | LFP | — | — | 2A | 0.3 | 74.2 | 31.3 | 87.4 | 44.7 |
| Comparative Example 3 | NCM | 1A | 0.2 | 2A | 0.3 | 75.5 | 46.3 | 87 | 33.3 |
| Comparative Example 4 | LFP | B1 | 0.2 | 2A | 0.3 | 68.3 | 47.1 | 84.6 | 45.4 |
| Comparative Example 5 | LFP | B2 | 0.2 | 2A | 0.3 | 70 | 42.9 | 85.7 | 43.3 |

From the results of Table 1, it can be confirmed that when the first additive and the second additive of the present application are simultaneously included as an electrolyte additive, both high temperature lifespan and storage characteristics are excellent.

Specifically, in the case of Examples 1 to 3, it can be confirmed that compared to not only Comparative Examples 1 and 2 in which the electrolytic solution including only one of the first additive and the second additive is applied, but also Comparative Example 3 in which an NCM positive electrode material, which is generally known to have excellent capacity characteristics as compared with LFP positive electrode materials, has excellent high-temperature life and storage characteristics.

In addition, even when the second additive is used, it can be confirmed that the high-temperature lifespan and the storage characteristics of Examples 1 to 3 are excellent as compared with the case of using Chemical Formula B1 having an imidazole structure in which an amino group is not substituted instead of the compound represented by Chemical Formula 1 (Comparative Example 4) and the case of using the Chemical Formula B2 having a phenylimidazole structure (Comparative Examples 5).

Accordingly, it is confirmed that the effect of the present disclosure can be achieved only when both the first additive and the second additive according to the present disclosure are included.

What is claimed is:

1. A lithium secondary battery comprising:
   a non-aqueous electrolyte comprising a lithium salt, an organic solvent, a first additive represented by Chemical Formula 1 and a second additive represented by the Chemical Formula 2;
   a positive electrode comprising a positive electrode active material comprising a lithium iron phosphate-based composite oxide;
   a negative electrode comprising a negative electrode active material; and
   a separator interposed between the positive electrode and the negative electrode,

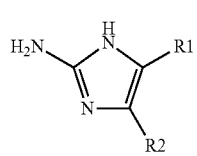

[Chemical Formula 1]

wherein,
R1 and R2 are each independently hydrogen; or an alkyl group having 1 to 5 carbon atoms,

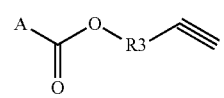

[Chemical Formula 2]

wherein,
A is a heterocyclic group having 3 to 5 carbon atoms or a heteroaryl group having 3 to 5 carbon atoms, and
R3 is an alkylene group having 1 to 3 carbon atoms.

2. The lithium secondary battery of claim 1, wherein in Chemical Formula 1, R1 and R2 are each hydrogen.

3. The lithium secondary battery of claim 1, wherein in Chemical Formula 2, A is a nitrogen-containing heterocyclic group having 3 to 5 carbon atoms or a nitrogen-containing heteroaryl group having 3 to 5 carbon atoms.

4. The lithium secondary battery of claim 1, wherein the non-aqueous electrolyte further comprises one or more third additives selected from the group consisting of vinylene carbonate, 1,3-propane sultone, and ethylene sulfate.

5. The lithium secondary battery of claim 1, wherein the content of the first additive is in a range of 0.05 wt % to 2 wt % based on the total weight of the non-aqueous electrolyte.

6. The lithium secondary battery of claim 1, wherein the content of the second additive is in a range of 0.05 wt % to 2 wt % based on the total weight of the non-aqueous electrolyte.

7. The lithium secondary battery of claim 1, wherein a weight ratio of the first additive and the second additive in the non-aqueous electrolyte is in a range of 1:0.5 to 1:2.5.

8. The lithium secondary battery of claim 1, wherein organic solvent comprises a mixture of a cyclic carbonate-based solvent and a linear carbonate-based solvent.

9. The lithium secondary battery of claim 1, wherein the lithium iron phosphate-based composite oxide is represented by the following Chemical Formula 3:

$$LiFe_{1-x}M_xPO_4 \qquad \text{Equation 3:}$$

wherein,
M is one or more selected from Ni, Co, Mn, Al, Mg, Y, Zn, In, Ru, Sn, Sb, Ti, Te, Nb, Mo, Cr, Zr, W, Jr, or V, and
$0 \leq x < 1$.

10. The lithium secondary battery of claim 1, wherein the negative active material comprises a carbon-based material.

11. The lithium secondary battery of claim 1, wherein the second additive is represented by Chemical Formula 2A:

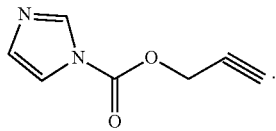

[Chemical Formula 2A]

12. The lithium secondary battery of claim 1, wherein the lithium iron phosphate-based composite oxide is LiFePO$_4$.

13. A non-aqueous electrolyte for a lithium secondary battery, comprising:
   a lithium salt;
   an organic solvent;
   a first additive represented by Chemical Formula 1; and
   a second additive represented by Chemical Formula 2,

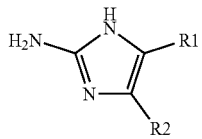

[Chemical Formula 1]

wherein,
   R1 and R2 are each independently hydrogen; or an alkyl group having 1 to 5 carbon atoms,

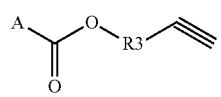

[Chemical Formula 2]

wherein,
   A is a heterocyclic group having 3 to 5 carbon atoms or a heteroaryl group having 3 to 5 carbon atoms, and
   R3 is an alkylene group having 1 to 3 carbon atoms.

14. The non-aqueous electrolyte of claim 13, wherein in Chemical Formula 1, R1 and R2 are each hydrogen.

15. The non-aqueous electrolyte of claim 13, wherein a weight ratio of the first additive and the second additive in the non-aqueous electrolyte is in a range of 1:0.5 to 1:2.5.

* * * * *